United States Patent
Eisenlord et al.

(10) Patent No.: US 6,398,995 B1
(45) Date of Patent: Jun. 4, 2002

(54) ROTATIONALLY MOLDED DOOR WITH INTEGRALLY MOLDED HINGE MEMBER

(75) Inventors: Daniel Richard Eisenlord; Thomas Lee McCormick, both of Bend, OR (US)

(73) Assignee: Chase Industries Inc., Cincinnati, OH (US)

( * ) Notice: Subject to any disclaimer, the term of this patent is extended or adjusted under 35 U.S.C. 154(b) by 0 days.

(21) Appl. No.: 09/686,494

(22) Filed: Oct. 10, 2000

(51) Int. Cl.[7] .............................. B28B 1/20; B29C 44/12
(52) U.S. Cl. ..................... 264/45.7; 264/46.6; 264/46.7; 264/271.1; 264/273; 264/311
(58) Field of Search ............................. 264/45.7, 46.6, 264/46.7, 271.1, 273, 311

(56) References Cited

U.S. PATENT DOCUMENTS

| | | |
|---|---|---|
| 2,774,117 A | 12/1956 | Eckel |
| 3,426,110 A | 2/1969 | Kesling |
| 3,498,001 A | 3/1970 | MacDonald |
| 3,660,941 A | 5/1972 | Shibuya |
| 3,827,183 A | 8/1974 | Zimmermann et al. |
| 3,962,827 A | 6/1976 | Chaffee |
| 3,979,872 A | 9/1976 | Gilchrist et al. |
| 4,072,548 A | 2/1978 | Gerson et al. |
| 4,078,334 A | 3/1978 | Lambias |
| 4,084,347 A | 4/1978 | Brown |
| 4,123,307 A | 10/1978 | Lemelson |
| 4,284,673 A | 8/1981 | Ockels |
| 4,419,307 A | 12/1983 | Kohara et al. |
| 4,478,005 A | 10/1984 | Mundschenk |
| 4,483,102 A | 11/1984 | Edwards |
| 4,570,384 A | 2/1986 | Eckel |
| 4,676,041 A * | 6/1987 | Ford ........................ 52/309.11 |
| 4,686,806 A | 8/1987 | Bennett |
| 4,765,935 A | 8/1988 | Fiorentini |
| 4,956,135 A | 9/1990 | Payne |
| 4,965,030 A | 10/1990 | Thorn |
| 5,327,682 A | 7/1994 | Holtz |
| 5,380,183 A | 1/1995 | Piazz et al. |
| 5,528,865 A * | 6/1996 | Johnson et al. ............... 49/501 |
| 5,693,271 A | 12/1997 | Johnson et al. |
| 6,092,343 A * | 7/2000 | West et al. .............. 52/309.11 |

FOREIGN PATENT DOCUMENTS

| | | |
|---|---|---|
| CA | 721064 | 11/1965 |
| CA | 983226 | 2/1976 |

* cited by examiner

Primary Examiner—Allan R. Kuhns
(74) Attorney, Agent, or Firm—William Michael Hynes; Townsend and Townsend and Crew, LLP

(57) ABSTRACT

A high impact resistant rotationally molded door and process for molding the door has the hinge post integrally attached to the rotationally molded skin of the door. A hinge member is provided that has a perforate U-shaped metal sheet bonded to preferably the upper portion of the hinge post. The sides of the U-shaped metal sheet are spaced sufficiently apart so that registration with the subsequently rotationally molded plastic skin of the door occurs. This hinge member at the perforate metal sheet rapidly heats during rotational molding. The perforate metal thus bonds to integrally mold with the skin of the door. This bonding occurs as the hinge post is molded within the hollow door construction along its hinging edge. The hinge member attaches at the perforate U-shaped metal sheet to the skin of the door while all other portions of the hinge post are free to move with respect to the door. The door is thus formed without door warping during curing and shrinking of rotationally molded plastic door body. Door warping is avoided. At the same time, when the door is in use, the perforate U-shaped metal sheet in its integral attachment to the rotationally molded skin of the door prevents dislodgment of the hinge post relative to the door.

4 Claims, 2 Drawing Sheets

ROTATIONALLY MOLDED DOOR WITH INTEGRALLY MOLDED HINGE MEMBER

This invention relates to so-called rotationally molded doors. More particularly, a rotationally molded door is disclosed in which the hinge post is integrally attached to the skin of the rotationally molded door

BACKGROUND OF THE INVENTION

In Johnson et al U.S. Pat. No. 5,693,271 entitled Rotationally Molding An Insulated Plastic Molded Door with Integral Hinge issued Dec. 2, 1997, there is disclosed a rotationally molded door of the type utilized in this disclosure. Simply stated, this patent disclosed a high impact resistant rotationally molded door and process for molding the door. In that disclosure, a hinge member is integrally molded to the door along one edge only. This hinge member forms to the hollow door edge without door warping during curing and shrinking of rotationally molded plastic door body. Door warping is avoided by delaying full integral attachment of the hinge member to the door until curing of the injected foam interior which both bonds to the interior of the door and the hinge member.

In Johnson et al U.S. Pat. No. 5,693,271, the hinge post extended from the top and bottom of the door. Due to expansion and contraction during the rotational molding process, it was desired not to attach the hard plastic skin of the door to the hinge post This enabled the respective ends of the hinge post to move with respect to the door skin after the molding was complete. Warping of the door from its planar disposition was avoided.

At the same time, it was necessary to key the hinge post to the door. Therefore, a tab was provided centrally of the hinge member. When the rotationally molded door was removed from the rotational mold, the molded door formed a hollow construction with the hinge post protruding through the hollow construction. This hollow construction was then injected with insulating and hardening foam. When the foam cured, it cured around the tab of the hinge post, holding the hinge post in place.

It is to be understood that the disclosed door is a heavy industrial type. As such, it includes a V-cam hinge, typically located and attached to the bottom corner of the hinge post. When the door is swung to the open position, the door rises on the hinge post against one side of the V-cam as the door swings to the open position. When the door is no longer held to the open position, the door falls on the hinge post against the V-cam and is biased to the closed position. It has been found in practice that this motion places considerable strain on the door hinge, and in particular on the attachment of the hinge post to the door. The result has been the occasional breaking of the union of the hinge post and door.

The reader will understand that this difficulty was only located after considerable experience. In so far as the prior art fails to teach this hinge post separation as a practical problem, at least partial invention is claimed in identifying the problem to be solved.

SUMMARY OF THE INVENTION

A high impact resistant rotationally molded door and process for molding the door has the hinge post integrally attached to the rotationally molded skin of the door. A hinge member is provided that has a perforate U-shaped metal sheet bonded to preferably the upper portion of the hinge post. The sides of the U-shaped metal sheet are spaced sufficiently apart so that registration with the subsequently rotationally molded plastic skin of the door occurs. This hinge member at the perforate metal sheet rapidly heats during rotational molding. The perforate metal thus bonds to integrally mold with the skin of the door. This bonding occurs as the hinge post is molded within the hollow door construction along its hinging edge. The hinge member attaches at the perforate U-shaped metal sheet to the skin of the door while all other portions of the hinge post are free to move with respect to the door. The door is thus formed without door warping during curing and shrinking of rotationally molded plastic door body. At the same time, when the door is in use, the perforate U-shaped metal sheet in its integral attachment to the rotationally molded skin of the door prevents dislodgment of the hinge post relative to the door.

DESCRIPTION OF THE SPECIFIC EMBODIMENTS

Figure 2:
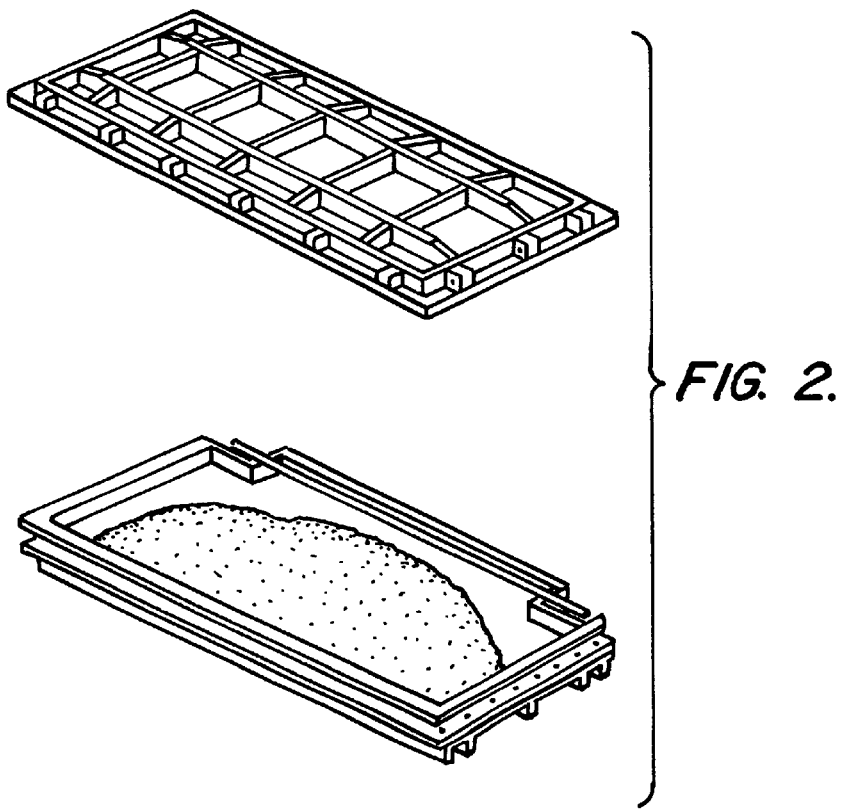
FIG. 2 is a perspective view of the mold only with the top plate shown in exploded relation overhead illustrating the placing and spreading of plastic within the mold and the integrally fastened hinge bar placed to the mold with the top and bottom areas of the hinge having mold release being differentiated from the rest of the hinge bar, and, FIG. 3 is an enlarged and cut away section of the ultimately formed door and integrally attached hinge post) illustrating the integral attachment of the hinge post through the perforate U-shaped metal hinge post attachment of this invention.
Figure 3:
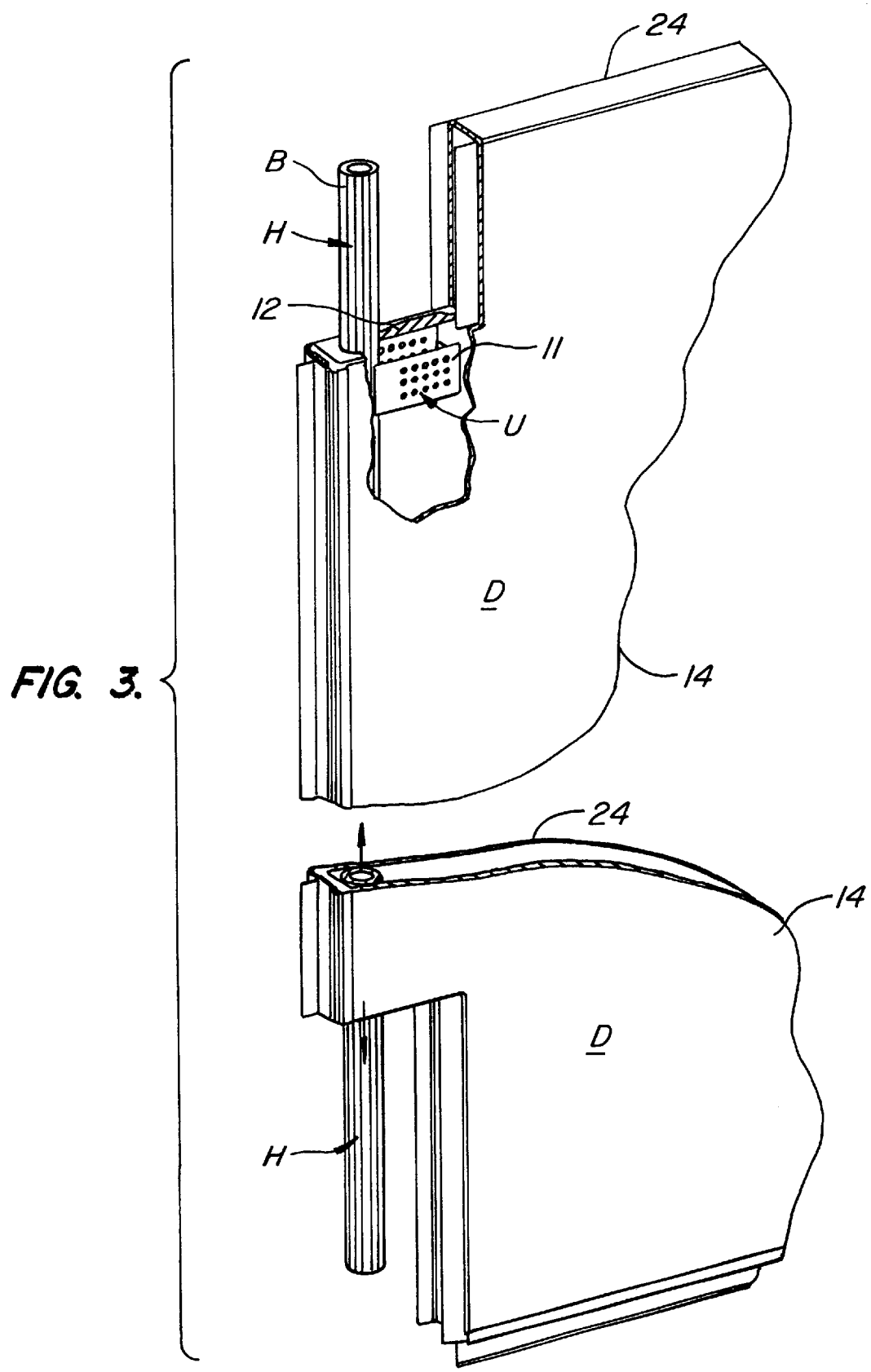

Referring to FIG. 2, mold M for rotational molding of door D is set forth (See FIG. 3). Referring to FIG. 3, the two major surfaces of door D including front surface 14 and rear surface 24 are molded across front surface aluminum sheet 44 and rear surface aluminum sheet 54. Each of these sheets is reinforced on the reverse side by longitudinal reinforcing members 45 and transverse reinforcing members 46, such reinforcing members only visible with respect to front surface aluminum sheet 44.

Rear surface aluminum sheet 54 has attached thereto U-shaped channels forming mold opening side edge 48, mold hinge side edge 50, mold top edge 51, and mold bottom edge 52. It will thus be seen that rear surface aluminum sheet 54 with its respective fastened edges forms cavity C into which plastic P can be placed for rotationally molding door D. It will be realized that when mold M is closed by front surface aluminum sheet 44 that hollow mold M will be formed.

It is required that hinge member H be integrally molded to hollow door body Y. In this disclosure, molding of hinge member H occurs to rotationally molded front surface 14 and rear surface 24. How this molding occurs can be understood by viewing FIG. 3.

Specifically, hinge member H includes bar B. Welded to bar B is perforate U-shaped sheet metal member U. Perforate U-shaped sheet metal member U includes opposed perforate sides 11 and 12. These members are spaced apart by a sufficient distance so that they are adjacent the respective major sides 44, 54 of mold M. At the same time, the spacing is made to place the respective opposed perforate sides 11 and 12 into the mass of the respective front surface 14 and rear surface 24 of door D when it is molded.

It will be understood that the perforate construction of opposed perforate sides 11 and 12 is important Specifically, the perforations that are placed in opposed perforate sides 11 and 12 enable these sides to rapidly reach the molding temperature of the rotational molds. Further, the perforations allow plastic to bond across the respective apertures and in and around the remaining metal. In this way, opposed perforate sides 11 and 12 become integral to and molded within front surface 14 and rear surface 24 of door D.

Figure 1:
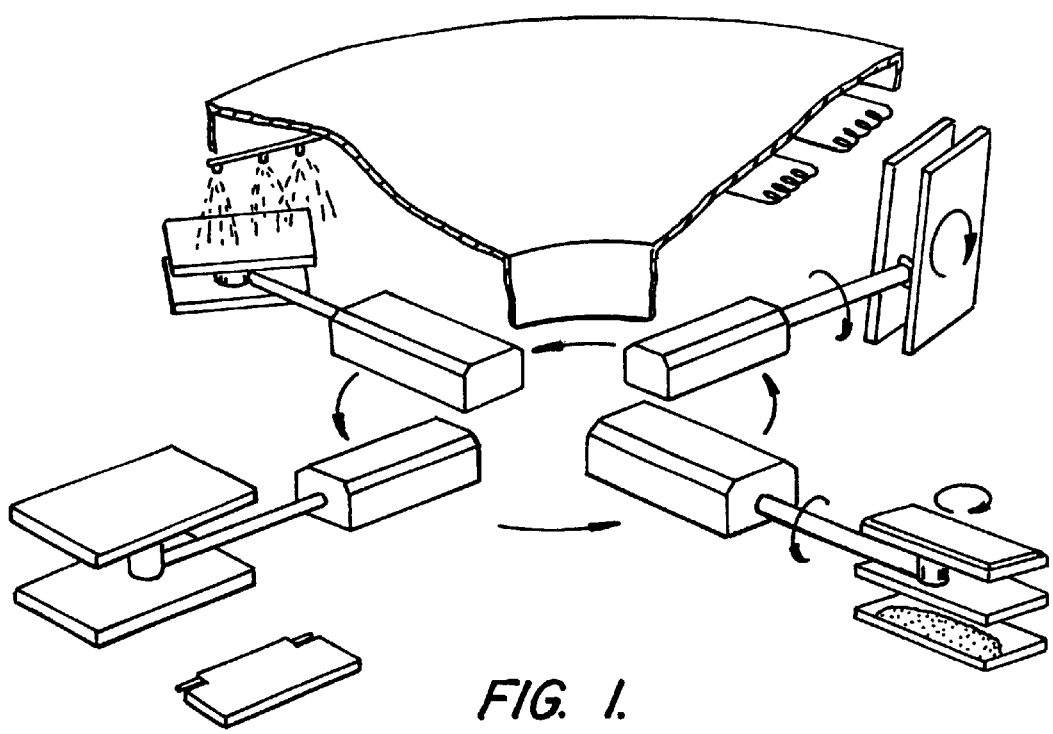
FIG. 1 is a perspective view of a turret type station apparatus including a first station for loading the mold of this invention, a second station for the oven contained rotational molding of the loaded mold, a third station for the cooling of the mold; and a fourth station for unloading and storing the mold.

Referring to FIG. 1, rotational molding is relatively easy to understand. Schematically, a turret type multiple station rotational molding station 64 is illustrated. It includes mold loading station 70, mold rotating station 72, mold cooling station 74, and product discharge station 76. At the end of rotational molding, there is discharged hollow door body Y having hinge member H integrally molded thereto.

Typically, and after rotational molding of hollow door body Y, the door by product is allowed to sit for a period of 24 hours. Thereafter, and as shown in FIG. 3, foam injections occur through aperture 80 and hose 82 from conventional foam producing apparatus (not shown). Such foam injection finally causes hinge member H to integrally bond to door D.

Once this has occurred, door D filled with foam is allowed to sit further for 24 hours.

Returning to FIG. 3, the reader will understand that hinge member H only bonds to door D at front surface 14 and rear surface 24. The remainder of hinge member H is free to move relative to door D.

It has been found that in use, bonding of hinge member H integrally with the rotationally molded front surface 14 and rear surface 24 prevent separation of the hinge member H from the door D under virtually all conditions of use. This construction is now preferred.

What is claimed is:

1. A process of molding a high impact resistant door comprising the steps of:
    providing a mold having an interior for defining a hollow rotationally molded six sided door including;
        a front door surface;
        a rear door surface;
        a top door edge;
        a bottom door edge;
        a hinge door edge; and,
        an opening door edge;
        said surfaces and edges of said provided mold forming an integral hollow cavity in the interior of said door,
    providing an elongate hinge member for placement into said mold;
    providing a U-shaped perforate metal member having opposite side edges of the U spaced a sufficient distance apart to enable each respective opposite side edge to embed in a skin of the rotationally molded door,
    integrally attaching the U-shaped perforate metal member to the elongate hinge member;
    placing the elongate hinge member into said mold extending along said hinge door edge within said integral hollow cavity of said door with the U-shaped perforate metal member having the respective opposite side edges disposed adjacent to the front door surface and rear door surface;
    placing plastic in said mold and rotationally molding said plastic to the interior of said mold to form a hollow plastic door having said front surface, said rear surface, said top door edge, said bottom door edge, said hinge door edge, and said opening door edge with upper and lower hinge member cavities defined in said door; and,
    embedding the opposite side edges of the perforate U-shaped metal member in the skin of the rotationally molded door during the rotational molding.

2. A process of molding a high impact resistant door according to claim 1 wherein the step of providing a mold having an interior for defining a hollow rotationally molded six sided door further includes:
    having said mold further define an upper hinge cavity in an upper corner of said door at said front door surface, rear door surface, top door edge and hinge door edge; and, having said mold further defining a lower hinge cavity defined in a lower corner of said door at said front door surface, rear door surface, bottom door edge and hinge door edge;
    extending the elongate hinge member into said upper hinge cavity and said lower hinge cavity.

3. The process of molding a high impact resistant door according to claim 1 comprising the steps of:
    coating said elongate hinge member with a release agent to prevent integral plastic bonding to said hinge member interior of said integral hollow cavity of said door, said coating extending interior of said integral hollow cavity of said door adjacent said upper hinge cavity and said lower hinge cavity, said elongate hinge member having an uncoated portion between said coated portions of said hinge member.

4. The process of molding a high impact resistant door according to claim 1 comprising the steps of:
    injecting a foam filler interior of said door integrally bonded within said integral hollow cavity of said door.

* * * * *